United States Patent
Hierold

(10) Patent No.: US 6,382,588 B1
(45) Date of Patent: May 7, 2002

(54) MICROVALVE

(75) Inventor: Christofer Hierold, München (DE)

(73) Assignee: Infineon Technologies A.G., Munich (DE)

( * ) Notice: Subject to any disclaimer, the term of this patent is extended or adjusted under 35 U.S.C. 154(b) by 0 days.

(21) Appl. No.: 09/708,283

(22) Filed: Nov. 8, 2000

Related U.S. Application Data

(63) Continuation of application No. PCT/DE99/01069, filed on May 6, 1999.

(30) Foreign Application Priority Data

May 8, 1998 (DE) .......................................... 198 20 739

(51) Int. Cl.[7] .............................................. F16K 31/02
(52) U.S. Cl. .............................. 251/129.04; 251/129.01
(58) Field of Search ....................... 251/129.01, 129.04, 251/129.06, 11, 331; 137/597, 637

(56) References Cited

U.S. PATENT DOCUMENTS

| | | | | |
|---|---|---|---|---|
| 4,581,624 A | * | 4/1986 | O'Connor .......... | 251/129.06 X |
| 5,180,623 A | * | 1/1993 | Ohnstein ........... | 251/129.01 X |
| 5,238,223 A | * | 8/1993 | Mettnet et al. ..... | 251/129.06 X |
| 5,271,724 A | * | 12/1993 | van Lintel ......... | 251/129.04 X |
| 5,322,258 A | * | 6/1994 | Bosch et al. ........ | 251/129.01 X |
| 5,758,864 A | | 6/1998 | Asai | |
| 5,941,501 A | * | 8/1999 | Biegelsen et al. ..... | 251/129.01 |

FOREIGN PATENT DOCUMENTS

| | | |
|---|---|---|
| DE | 44 22 941 A1 | 1/1996 |
| DE | 44 22 945 A1 | 1/1996 |

OTHER PUBLICATIONS

Patent Abstracts of Japan No. 62–028585 (Toshio), dated Feb. 6, 1987.
Patent Abstracts of Japan No. 03–084270 (Toshio), dated Apr. 9, 1991.

* cited by examiner

Primary Examiner—Kevin Shaver
Assistant Examiner—Eric Keasel
(74) Attorney, Agent, or Firm—Herbert L. Lerner; Laurence A. Greenberg; Werner H. Stemer

(57) ABSTRACT

The valve seat is located between an inlet opening and an outlet opening, with a connecting stub against which an elastic membrane presses. The membrane is disposed above a cavity and formed by a part of a polysilicon layer. When a medium flows onto the side of the membrane facing the connecting stub, the membrane is lifted off the connecting stub and is pulled into the cavity, so that the medium can flow through the valve. The membrane can be stiffened by a stamp-like attachment, in order to ensure that the valve opens uniformly.

5 Claims, 2 Drawing Sheets

MICROVALVE

CROSS-REFERENCE TO RELATED APPLICATION

This is a continuation of copending international application PCT/DE99/01069, filed May 6, 1999, which designated the United States.

BACKGROUND OF THE INVENTION

FIELD OF THE INVENTION

The present invention relates to a valve which can be produced micromechanically.

In order to burn fuels in internal combustion engines such that the emissions are reduced, fuels must be injected in a controlled manner, reproducibly and reliably into the induction area or combustion chamber. The fuel is intended to be supplied via a miniaturized, controllable, robust and rapidly reacting valve, which can be produced economically, closes forming a seal without any energy being supplied (normally closed, no leak), is integrated in the injection nozzle and can be operated with a low level of electrical power. Present-day injection valves are constructed from a multiplicity of individual mechanical components and are generally composed of stainless steel. The valve is formed by a valve pin which is rounded in the shape of a hemisphere and slides into a valve seat, which is in the form of a hollow sphere. This valve is driven via electromagnetic (coils) or piezoelectric actuator drives. The precise interaction of the individually manufactured parts governs the accuracy and leakage rate of the valve. As a result of the large masses to be moved, such valves are slow and satisfy the requirements for fuel injection in modern engines only inadequately.

A microvalve is described in German patent application DE 44 2 941 A1. That valve can be produced micromechanically and it is in the form of a multilayer structure with two membranes and with a gas channel system with radially arranged channels.

SUMMARY OF THE INVENTION

The object of the invention is to provide a microvalve which overcomes the above-noted deficiencies and disadvantages of the prior art devices and methods of this kind, and which can be produced easily and is suitable for installation in internal combustion engines.

With the above and other objects in view there is provided, in accordance with the invention, a microvalve, comprising:

a first silicon substrate formed with a valve seat having a flat edge and an outlet opening bordered by the flat edge;

a second silicon substrate permanently connected to the first silicon substrate, the second silicon substrate having a cavity and an inlet opening formed therein;

a membrane layer of polysilicon forming a membrane adjacent the cavity;

the membrane being electrically conductive and having a first side facing away from the cavity and selectively pressing against the flat edge of the valve seat for closing the valve opening;

the inlet opening and the outlet opening being bounded by the first side of the membrane opposite the cavity;

an electrode formed on a side of the cavity distal from the membrane; and a drive circuit electrically connected to and applying a voltage between the electrode and the membrane for selectively moving the membrane into the cavity and lifting the membrane from the flat edge of the valve seat for establishing a communication between the inlet opening and the outlet opening.

In accordance with an added feature of the invention, the first and second substrates define a contact pressure between the membrane and the flat edge of the valve seat.

In accordance with an additional feature of the invention, the membrane is movably disposed above the cavity parallel to the flat edge of the valve seat.

In accordance with another feature of the invention, the membrane is disposed above the cavity and elastically deformable parallel to the flat edge of the valve seat.

With the above and other objects in view there is also provided, in accordance with the invention, a microvalve assembly formed with a plurality of individual microvalves as described above, and a common drive circuit configured to open an appropriate number of valves in dependence on a desired flow rate.

In accordance with a concomitant feature of the invention, a microvalve according as described above is integrated together with at least one sensor, and an electronic control circuit receiving a sensor signal from the at least one sensor and for driving the microvalve in dependence on the sensor signal received from the sensor.

In other words, in the microvalve according to the invention, the valve seat, with a closure part, is located between an inlet opening and an outlet opening. The valve seat essentially comprises a substrate having a connecting stub for the inlet or the outlet opening. When the valve is in the rest position, the closure part is pressed against the connecting stub. The closure part essentially comprises a micromechanical elastic membrane, preferably a part of a polysilicon layer, one side of which is pressed against the connecting stub and on whose other side there is a cavity into which the membrane can be pressed. When a gas or a liquid flows onto the side of the membrane facing the connecting stub, the membrane is lifted off the connecting stub and is pressed into the cavity, so that the gas or the liquid can flow from the inlet opening, past the edge of the connecting stub, into the outlet opening of the valve. The membrane can be stiffened by a stamp-like attachment in order to ensure that the valve opens uniformly.

Other features which are considered as characteristic for the invention are set forth in the appended claims.

Although the invention is illustrated and described herein as embodied in a microvalve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
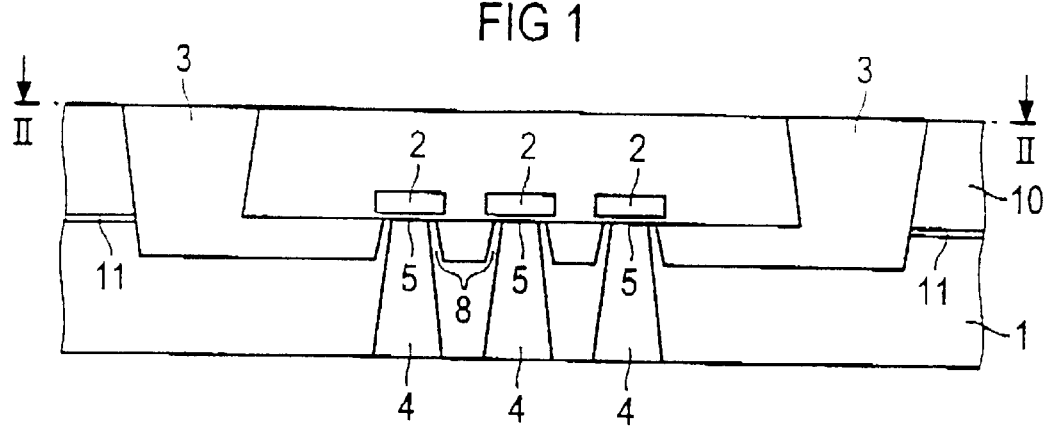
FIG. 1 is a partial section of the valve according to the invention.

Referring now to the figures of the drawing in detail and first, particularly, to FIG. 1 thereof, there is seen a microvalve that is preferably produced from a number of layers using micromechanical methods. The valve seat is located on a substrate 1 which may be, for example, a silicon body. Since the production process is simplified when only upper faces of substrates are processed, the exemplary embodiment shown in FIG. 1 is composed of two substrates 1, 10, whose structured upper faces face one another and are permanently connected to one another (for example by means of wafer bonding). In the drawing figure, the two substrates are connected via a connecting layer 11. In principle, the microvalve may alternatively be in the form of a layer structure on an upper face of only one substrate.

In the exemplary embodiment of FIG. 1, the inlet opening 3 is at the top, that is to say in the second substrate 10. However, in principle, the inlet opening may also be provided on the same side as the outlet opening 4, namely on the lower face of the first substrate 1. The inlet opening 3 and the outlet opening 4 may comprise a plurality of channels one valve closure may in each case be associated with each channel individually, or with groups of channels jointly.

One such closure comprises a connecting stub 8 which, in the illustrated exemplary embodiment, is associated with the outlet opening 4, although it may also be a part of the inlet opening 3, and also comprises an elastic membrane 5 against which the connecting stub presses, so that its opening is closed. On the opposite side of the membrane 5, a cavity is formed in the second substrate 10 or in a corresponding layer, into which cavity the membrane can be pressed.

Figure 2:
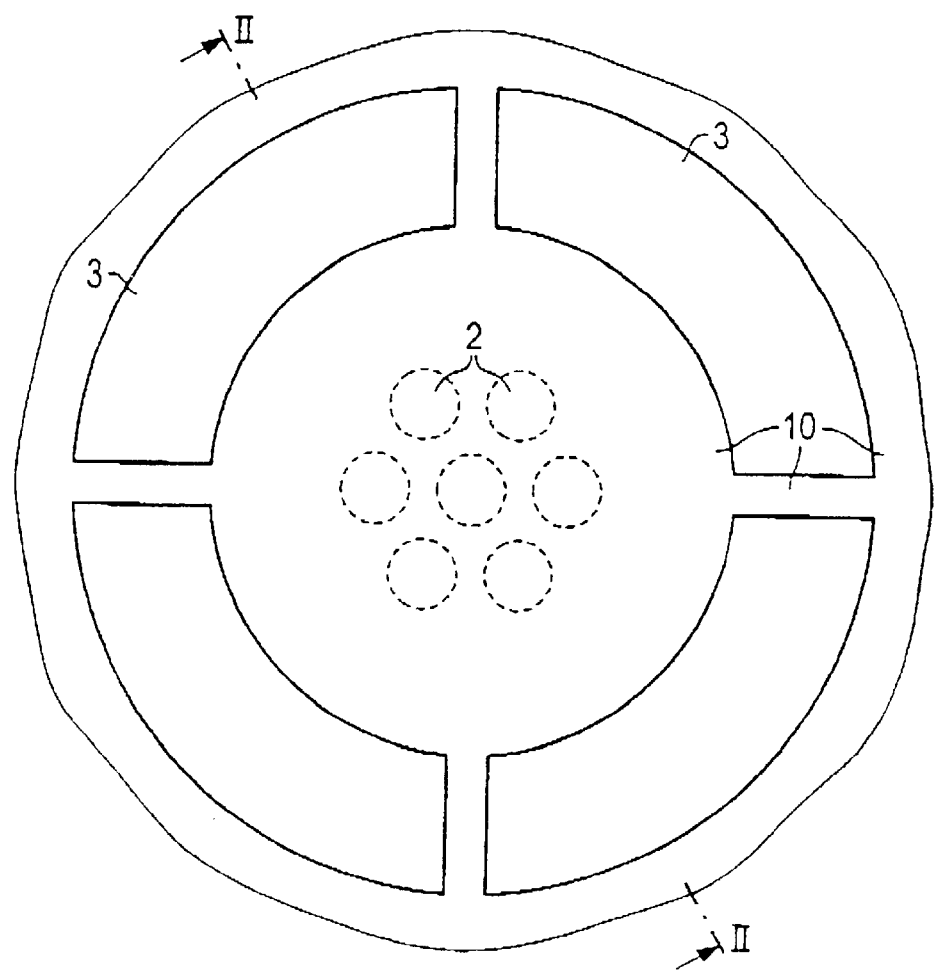
FIG. 2 is a section taken along the line II—II in FIG. 1.

Referring now to FIG. 2, the section along the line II—II indicated in FIG. 1, shows a view of the valve with the position of the individual valve closures as concealed contours. The second substrate 10 is formed with an annular inlet opening 3, which is interrupted only by four connecting webs. The inlet opening 3 opens into an intermediate space between the substrates 1, 10, and this intermediate space leads to the connecting stubs in the center. The dimensions of the cavities 2, which are shown here as being round by way of example and which also correspond approximately to the dimensions of the connecting stubs and of the membranes, are indicated as concealed contours by dashed lines in FIG. 2 in order, as an example, to reflect the arrangement of closable outlet openings, of which there are seven in this case.

Figure 3:
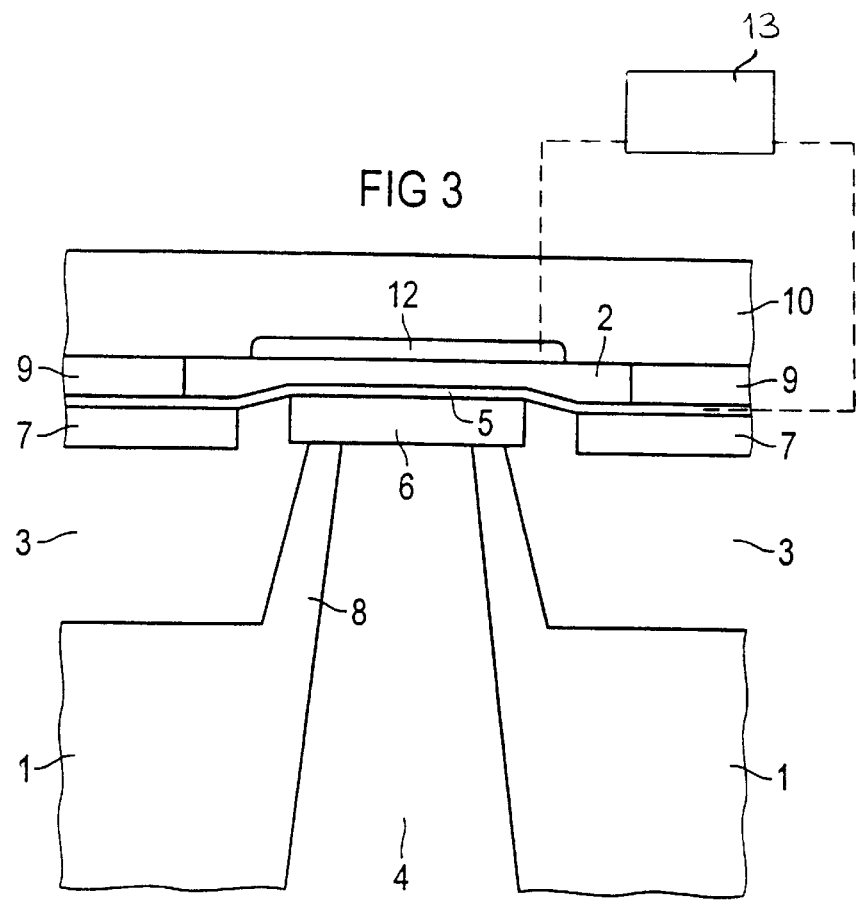
FIG. 3 is a partial diagrammatic view of the valve mechanism in a closed position.
Figure 4:
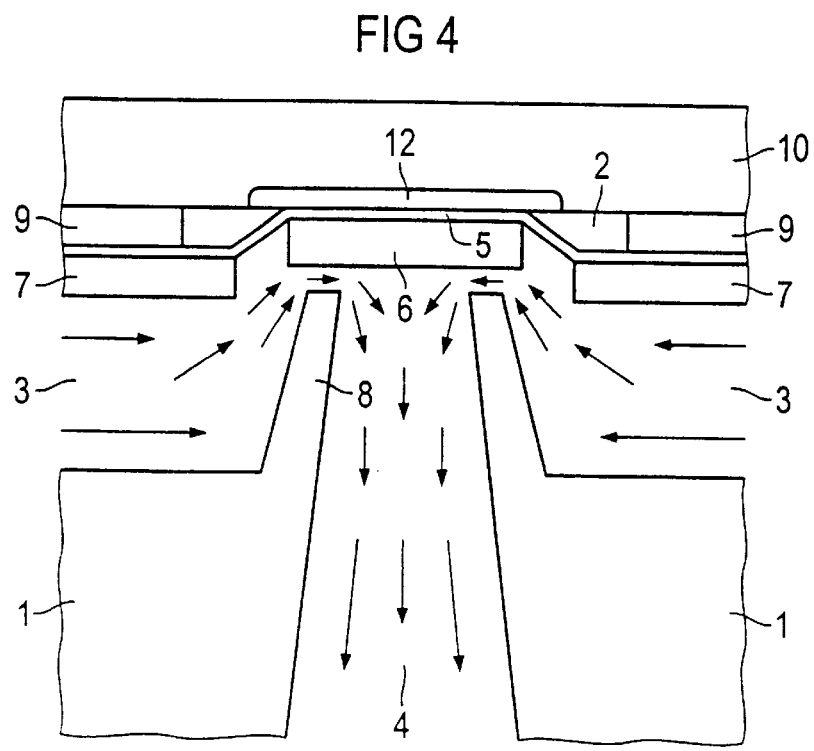
FIG. 4 is a similar view showing the valve mechanism in an open state and with flow arrows.

FIGS. 3 and 4 show an enlarged cross section of the closure mechanism. FIG. 3 shows a connecting stub 8 of an outlet opening 4 in the first substrate 1. The illustration shows the microvalve in the closed, normal state. The membrane 5 is part of a layer which in this case, by way of example, is held between a covering layer 7 (for example composed of oxide or nitride) and an auxiliary layer 9 (for example composed of oxide). The covering layer 7 has a cutout for the membrane.

The cavity 2 is formed in the auxiliary layer 9. A stamp-like attachment 6, facing the connecting stub 8, is located on the membrane 5 in order to stiffen the membrane and in order to improve the closure characteristics. This stamp-like attachment, which may also be omitted, may be composed in particular of a material which, by virtue of its elasticity or because it has a high chemical or physical resistance capability, is particularly suitable for reliable closure of the valve even after lengthy stressing. The stamp-like attachment 6 may be formed, in particular, by a part of the suitably structured covering layer 7.

FIG. 4 shows the same detail as FIG. 3 when the valve is open. Gas which flows in from the inlet opening 3, and is indicated by the arrows, presses from underneath against the membrane 5 and against its stamp-like attachment 6, so that the attachment 6 is lifted off the edge of the connecting stub, opening the path for the gas into the outlet opening 4. In the illustration in FIG. 4, the membrane 5 is pressed against the upper wall of the cavity, so that the closure is fully open. The closures act in a corresponding manner on the other supporting stubs of the various outlet openings.

Preferred dimensions for the exemplary embodiment illustrated in the figures are: overall diameter approximately 15 mm, diameter of the area occupied by the individual valves approximately 10 mm, vertical size of the flow channel between the substrates approximately 50 $\mu$m, diameter of the outlet opening approximately 50 $\mu$m, thickness of the covering layer 7 approximately 2–3 $\mu$m, thickness of the membrane layer 5 approximately 0.4 $\mu$m, thickness of the auxiliary layer 9 approximately 0.6 $\mu$m, and thickness of the substrate typically approximately 0.5 mm.

The principle of the microvalve according to the invention can easily be seen from the exemplary embodiment. The essential features are a valve seat with an opening having a flat edge, an elastic membrane above a cavity and pressing against the preferably raised edge of the opening so that the opening is closed, and an inlet channel and an outlet channel which are guided on different sides of this opening and on the same side of the membrane with respect to the valve seat. The membrane is preferably a part of an elastic layer which is embedded in a multilayer structure and may be, in particular, polysilicon. This layer may be very thin and may be thickened in the region of the opening that is to be closed, or may be reinforced with a further layer (stamp-like attachment) in order to improve the closure characteristics.

The valve may also be operated actively, with the membrane 5 being lifted off the connecting stub 8 by means of a suitable drive circuit. The driving of the valve may be effected, for example, by means of electrostatic attraction. To this end, the material of the membrane is designed to be electrically conductive. If polysilicon is used for the membrane, the polysilicon can be doped such that it is electrically conductive. The electrode 12 is formed on the wall of the cavity 2 opposite the membrane, for example by doping a region in the semiconductor material of the second substrate 10. The membrane and the electrode 12 are connected to an electronic circuit, which can be integrated in a manner known per se in one of the substrates and to which an electrical voltage can be applied such that the membrane is drawn toward the upper wall of the cavity by means of electrostatic forces, allowing the valve to open. An exemplary drive circuit 13 is diagrammatically indicated in FIG. 3, together with the schematic electrical connections to the membrane 5 and the counter-electrode 12.

The microvalve has a large number of advantages over conventional microvalves. Even with the embodiment which is composed of substrates that are processed on one face, the number of assemblies which must be joined together such that they fit accurately is reduced to two. The second substrate 10 preferably contains all the active functional blocks, such as the moving and possibly driven valve parts (membranes produced using surface micromechanical methods, possibly with a stamp), sensors, drive and control circuits for active operation of the valve. The inlet openings, for example for the fuel, are preferably located in this substrate. The first substrate 1 is preferably not provided with a layer structure, but is only processed using bulk micromechanical methods for processing solid substrate bodies. It contains the valve seats, flow channels and the valve outlet openings.

The basic geometry of the valves may also be rectangular, and this is more suitable for micromechanical production methods. The valve function of the overall component is preferably ensured by means of a multiplicity of small individual valves (for example approximately 8000 for a flow cross section of 0.6 mm$^2$). If the valve has a multiplicity of individually drivable individual valves (that is to say which can be switched actively), the flow rate can be adjusted in very small steps over a wide range without having to control the opening travel of an individual valve. An individual valve which is controlled thus preferably has only two possible states: open or closed. The flow rates may be controlled by sensors integrated in the substrate, by means of which, for example, the flow rate, the pressure of the flow or the temperature is measured.

The valve is normally closed. The contact pressure of the membrane or of the stamp on the edge of the valve seat is adjusted by the arrangement of these parts on the assembled substrates. If the diameter of the region occupied by the individual valves is approximately 10 mm and the diameter of the outlet opening is approximately 50 to 100 µm, parallel movement or through-bending of the membrane of 100 nm, resulting from the contact pressure of the valve seat, is sufficient with a polysilicon membrane having a thickness of approximately 0.4 µm to close the valve without having to apply any additional forces other than an overpressure of 3 bar.

During active operation of the valve, the individual valve is opened by application of an electrical voltage between the membrane and the electrode, which is formed by doping on the other side of the cavity in the substrate. Voltages of less than 100 V are sufficient for this purpose. The valve is opened electrostatically virtually without any power consumption by the associated circuit. Owing to the geometrical arrangement, the drive is located outside the valve region which is in contact with the medium (fuel) flowing through it, and is thus protected. The valve can thus be used for metering the flow rate of electrically conductive media.

If it is intended to control the flow rate, an assembly of the described embodiment is preferably used which has a plurality of actively operated individual microvalves. The flow rate is regulated or controlled by the number of respectively open valves. In particular, a drive circuit can be provided for this purpose, which in each case opens an appropriate number of valves depending on the desired flow rate.

If automatic regulation or control of the valve is required, the valve can be integrated with one or more, in particular micromechanical, sensors and can be provided with an electronic control circuit, which is intended to be used as a drive circuit for the valve and, at the same time, for detecting and evaluating a sensor signal, and by means of which the valve can be driven as a function of the sensor signal.

Owing to the small mass of the valve membrane and its small dimensions, the resonant frequency of the mechanical system is very high (typically approximately 1 MHz). This guarantees that the valve has a short response time, which is governed predominantly by the characteristics of the flowing medium.

The valve is largely miniaturized and can be produced easily and economically in large quantities. Particularly with a sensor system integrated in the valve body and with an integrated electronic circuit for operating the sensors and controlling the valve, there are a wide range of possible applications for the valve according to the invention. Such integration is made easier by the fact that the valve according to the invention can be produced together with further semiconductor components using silicon.

I claim:

1. A microvalve, comprising:

a first silicon substrate formed with a valve seat having a flat edge and an outlet opening bordered by said flat edge, said valve seat further having a connecting stub;

a membrane formed from polysilicon pressing against said connecting stub;

a second silicon substrate permanently connected to said first silicon substrate, said second silicon substrate having a cavity and an inlet opening formed therein, such that said membrane is lifted off said connecting stub and is pulled into said cavity, thereby forming a connection between said inlet opening and said outlet opening, and setting a contact pressure between said membrane and said flat edge, thereby causing a parallel movement or through-bending of said membrane;

said membrane disposed adjacent said cavity;

said membrane being electrically conductive and having a first side facing away from said cavity and selectively pressing against said flat edge of said valve seat for closing said outlet opening;

said inlet opening and said outlet opening being bounded by said first side of said membrane opposite said cavity;

an electrode formed on a side of said cavity distal from said membrane; and a drive circuit electrically connected to and applying a voltage between said electrode and said membrane for selectively moving said membrane into said cavity and lifting said membrane from said flat edge of said valve seat for establishing a communication between said inlet opening and said outlet opening.

2. A microvalve assembly, comprising a microvalve according to claim 1 integrated with at least one sensor, and an electronic control circuit receiving a sensor signal from said at least one sensor and for driving said microvalve as a function of the sensor signal.

3. The microvalve according to claim 1, wherein said membrane is movably disposed above said cavity parallel to said flat edge of said valve seat.

4. The microvalve according to claim 1, wherein said membrane is disposed above said cavity and elastically deformable parallel to said flat edge of said valve seat.

5. A microvalve assembly formed with a plurality of individual microvalves according to claim 1, and a common drive circuit configured to open an appropriate number of valves in dependence on a desired flow rate.

\* \* \* \* \*